G. H. STONE.
SURVEYING INSTRUMENT.
APPLICATION FILED JAN. 18, 1909.
1,032,437.
Patented July 16, 1912.
2 SHEETS—SHEET 1.
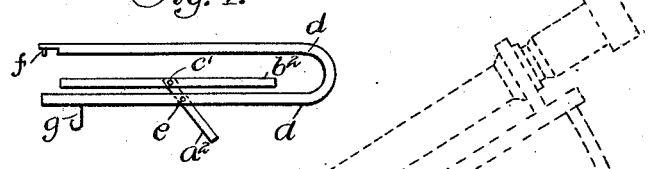
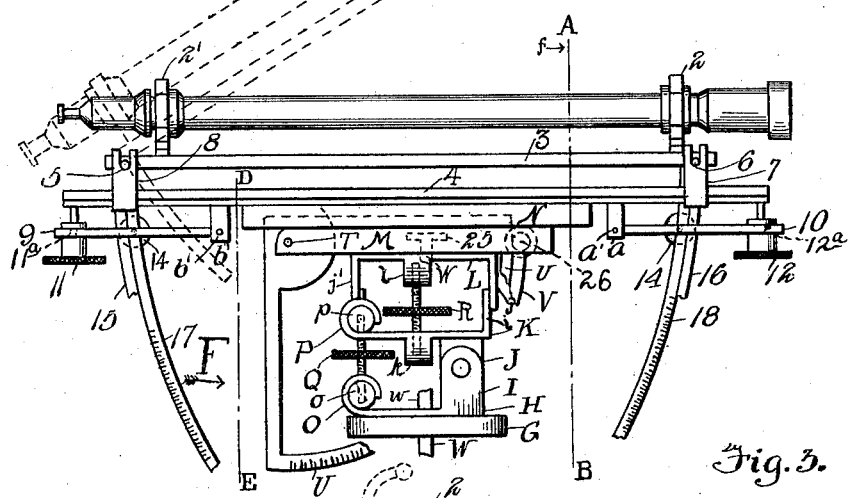

G. H. STONE.
SURVEYING INSTRUMENT.
APPLICATION FILED JAN. 18, 1909.
1,032,437.
Patented July 16, 1912.
2 SHEETS—SHEET 2.
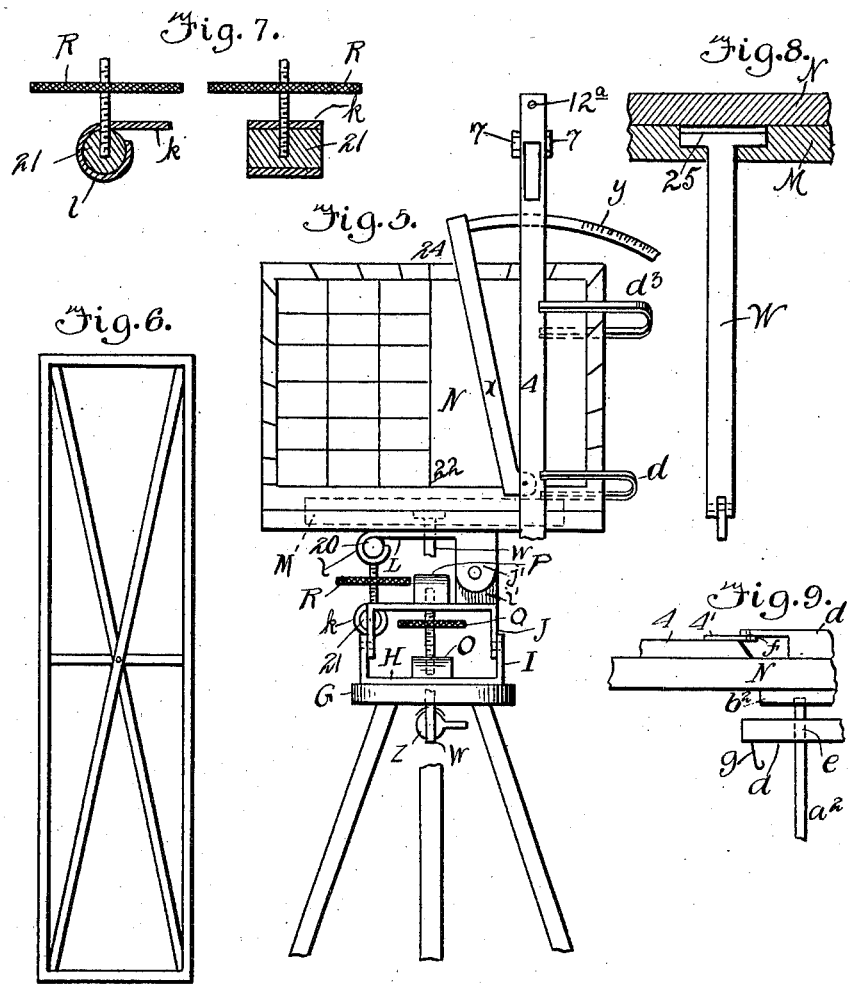

UNITED STATES PATENT OFFICE.

GEORGE H. STONE, OF COLORADO SPRINGS, COLORADO.

SURVEYING INSTRUMENT.

1,032,437. Specification of Letters Patent. Patented July 16, 1912.

Application filed January 18, 1909. Serial No. 473,028.

*To all whom it may concern:*

Be it known that I, GEORGE H. STONE, a citizen of the United States of America, residing at Colorado Springs, in the county of El Paso and State of Colorado, have invented certain new and useful Improvements in Surveying Instruments, of which the following is a specification.

This invention relates to measuring instruments and particularly to surveying apparatus having novel means for adjusting the parts whereby the line of sight can be changed at the will of the operator.

An object of this invention is to provide a table for supporting a telescope, novel means being provided for tilting the table longitudinally and transversely of the axis of the telescope, means being also provided for adjusting the telescope support independently of the table.

By the use of a surveying instrument embodying the invention, a great variety of adjustments of the line of sight are attained. The instrument is capable of being used to measure the most complicated passages in mines, whether horizontal, vertical or inclined—all the measurements required in topographic surveys of the most irregular surfaces. It can be used to make roughly all the measurements that can be made by the existing engineer's transit, level and plane table combined, and it can also be used to measure angles of inclination in a plane perpendicular to the line of sight, as the slope of a hill as it appears from a distance, of a pyramid, embankment, etc. One of its many uses is to measure the dip of exposed geologic strata from a distant point on the line of their strike, from which measurement the outcrops of stratified rocks, coal beds, etc., can be more easily traced where they are hidden by drift or cross hills and valleys. The instrument can be used astronomically for the measurement of the angular distance between two heavenly bodies in the plane passing through them and the instrument, no matter what are their positions.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a view in elevation showing a surveying instrument embodying the invention. Fig. 2, is a sectional view on the line A—B of Fig. 1, looking in the direction of the arrow *f*. Fig. 3, is a detail view of a limb securing device whereby the said limb is held in its adjusted positions. Fig. 4, is a detail view of an alidade clamp. Fig. 5 is a sectional end elevation taken on line D—E, of Fig. 1, looking in the direction of the arrow F, the table being shown tilted at an angle of 45 degrees above the horizontal, the telescope S and movable arm 3 being omitted. Fig. 6 is a plan of one form of the table of Fig. 1. Fig. 7, is a cross section showing the relation of the screw to the round nut or threaded block contained in the socket which is attached to the plate. Fig. 8, is a section showing the detail of the bolt or hollow spindle in its working position relative to the upper plate and the table. Fig. 9 is a detail side view of the alidade clamp. Fig. 10, shows side elevations and plans of two forms of alidade-clamps, all of each clamp being removed except the tip of the upper prong of the fork.

In these drawings G, denotes a tripod head having a plate H thereon, provided with ears I, which ears are pivotally connected to ears J, depending from a plate K, the said plate K, having angular ends similar to ears I adapted to be pivotally connected to angular ends of a plate L, designed to support a plate M, which hinged plate supports the table N and rotates about the vertical pivot or spindle W. The plate M rests on the plate L and rotates in a plane perpendicular to the axis W, which axis is in general a solid bolt which may be either threaded at its lower end and drawn downward on the plate M by an ordinary thumbnut or by the eccentric *z*. For special uses the solid bolt as a vertical axis may be replaced by a hollow spindle.

The upper surface of the table N has its edge graduated to degrees of angle by straight lines radiating from some point on the table as a center, and it is also ruled in squares for the purpose of measuring by inspection the rectangular coördinates of the observed angles. The line 22—24 lies in a plane that is perpendicular to the axis of the table-hinge.

On the table N is the alidade-base 4, the rocking arm and its attachments being removed. The alidade-base is clamped to the table by the pivot-clamp $d$ and by the set clamp $d^3$.

$x$ denotes a swinging arm removably pivoted to the side of the alidade-base 4. The lateral arm $x$ carries an arcuate, graduated arm $y$ near its free end. A clamp member having a vernier thereon may be secured to the arm $x$ in such relation to the arcuate arm as to hold the latter in adjusted position and to indicate the angle measured on the scale. This clamp and vernier being of ordinary and well known construction is not shown. In Fig. 6, the truss shown is in fact a table partly cut away in order to reduce the weight of the larger instruments. When used it is hinged to the plate M like the board or continuous table N shown in Fig. 1 and Fig. 5, and is adjusted to position and operated by aid of the same attachments. The plate H, has its end formed into a socket O, designed to receive a threaded block $o$, and the plate K has a similar socket P, to receive a threaded block $p$. The threaded blocks $o$ and $p$, receive the ends of a thumb screw Q, which has its ends provided with threads oppositely pitched and the said thumb screw Q, operates to cause the plate K, to swing on the pivot of the ears I and J, for the purpose of tilting said plate K. The plates K and L, are provided with threaded blocks 21 and 20, respectively, designed to receive the thumb screw R, which has threads on its ends oppositely pitched in order that movement of the screws will adjust the plate L, on the pivots in order that the said plate L may be swung to tilt the plate M and the table N.

The table N is pivoted to the plate M, at one end as shown at T, and the said table may be moved on its pivot in order that the table may be raised to a vertical position or to a position between the vertical and the horizontal. The table is provided with a graduated arc or limb U, which may be fixed to plate M by the clamp screw 26, and it may also be provided with a vernier V of ordinary type.

The alidade has a base 4, which rests on the table N, and said alidade base is provided with lugs 7 and 8, which in turn are provided with slots to form seats or supports for the pivots 5 and 6, about which the movable arm 3, with its attached telescope can be made to rotate from a horizontal to an inclined position. The telescope is attached to the rocking arm or bar 3, by the telescope supports 2 and 2'. The rocking arm or bar 3, is provided with the graduated arcs or limbs 17, 18, which are firmly attached to said rocking arm near its ends and preferably they are made to point downward. Fractions of degrees on these arcs or limbs are read by means of verniers 15 and 16, which are attached to the alidade base 4. The arcs or limbs 17 and 18, move freely up and down in slots cut through the alidade base 4, and are secured in any desired position by the set screws 14 in the clamps 9 and 10, to which are attached the tangent screws 11 and 12, working in threaded holes $11^a$ and $12^a$ in the alidade base 4. The lugs $a$ and $b$, are attached to the alidade-base and the ends of the clamps 9 and 10, are hinged to these by the pivots $a'$ and $b'$.

As shown in Fig. 2, the alidade may have a ring bearing cross wires $c$, inserted in the supports at each end of the rocking bar instead of the telescope. A peep sight may replace one of the cross wire sights.

The clamps 9 and 10 are moved upon their pivots $b'$ and $a'$, respectively, by the screws 11 and 12. The Y's of the telescope support have top portions which are hinged to the lower portions so that the hinged portions can be raised to the dotted line position show in Fig. 2, whereupon the ring containing the cross wires can be replaced by some other form of open sight or by a telescope.

In Fig. 4 I show an alidade clamp in which the lever $a^2$, is attached to the movable bar $b^2$, by means of the pivot $c'$, and is hinged to the under arm of the U-shaped bar $d$, by means of the pivot $e$. The upper end of the U-shaped bar or clamp is cut away on its under surface to a width equal to the thickness of the alidade base, and the pivot $f$ extends from it down to near the base of the upper arm. In use this pivot is made to enter a hole in a small projection from the side of the fiducial edge of the alidade base. The center of this hole is in the plane of the fiducial edge, and directly below it on the under arm of the U-shaped bar or clamp a hook $g$ is attached on which the string of a plumb-bob can be hung. In practice the clamp is placed astride of the table and moved until the center of the plumb-bob is over the center of the station in the field. The pivot $f$, having previously been inserted in the hole in the side of the projection from the alidade base, the lever $a^2$ is pushed so as to bring the movable bar up firmly against the under surface of the table. The alidade can now be rotated on the table around the pivot $f$, as a fixed center.

I have shown in Fig. 9 the tip of the pivot alidade-clamp inserted in a lug 4', projecting from the edge of the alidade-base 4 in its place on the table. On the lower prong is shown the hook for the plumb-bob string, and the movable bar $b^2$ that is operated by the lever $a^2$.

The ends of the upper prongs of the set-clamp are illustrated in elevation, as at $d^3$, and in plan $d^4$, Fig. 10 and the wedge alidade-clamp is illustrated in elevation as $d'$, and in plan, as $d^2$.

I claim—

1. In a surveying instrument, a tripod, a plate thereon, a second plate hinged to the first mentioned plate and adapted to be swung on its hinge, a third plate hinged to the second named plate and adapted to swing in a plane at right angles to the plane of swing of the second named plate, means for adjusting and retaining the plates in adjusted relation, and means for adjustably supporting a sighting instrument with relation to said plates.

2. In a surveying instrument, a tripod, plates one above the other connected to the tripod, said plates being hinged to swing in planes at angles to one another, a table supported by said plates, a sighting instrument, and means resting on the table for supporting the sighting instrument.

3. In a surveying instrument, a tripod, a plate thereon having ears and a nut, a plate having a nut hinged thereto, an adjusting screw connecting the nuts, a plate hinged to the second named plate and adapted to swing at an angle with relation to the swinging motion of the second named plate, means for adjusting the third mentioned plate, and means for supporting a sighting instrument on said third mentioned plate.

4. In a surveying instrument, a tripod, plates thereon swingingly connected to move in different directions, means for adjustably connecting the plates, an alidade bars, an arm pivotally supported on the alidade base, and a sighting instrument on the arm.

5. In a surveying instrument, plates connected to swing in planes at angles to one another, a table pivotally connected to one of the plates, an alidade base, a bar pivotally connected thereto, limbs connected to the bar and adjustably movable through the alidade base, and means for holding the limbs in adjusted position.

6. In a surveying instrument, a tripod, plates on the tripod connected to swing at angles to one another, a table pivotally connected to one of the plates, an alidade base thereon, a bar pivotally connected thereto, limbs connected to the bar and movable through slots in the alidade base, an alidade clamp for the alidade base, and means for holding the limbs in adjusted position.

7. In a surveying instrument, a tripod, plates on the tripod connected to swing at angles to one another, a table pivotally connected to one of the plates, an alidade base thereon, a bar pivotally connected thereto, limbs connected to the alidade base and movable through slots in the alidade base, and an alidade clamp for the alidade base.

In testimony whereof I have hereunto affixed my signature in the presence of two witnesses.

GEORGE H. STONE.

Witnesses:
 FRED E. MEFFORD,
 FRANK J. BAKER.

---

Copies of this patent may be obtained for five cents each, by addressing the "Commissioner of Patents. Washington, D. C."